United States Patent [19]
Huffman et al.

[11] 3,771,514
[45] Nov. 13, 1973

[54] LARYNGOSCOPE

[75] Inventors: John P. Huffman, Chicago, Ill.; Carl L. Foltz, Holiday, Fla.

[73] Assignee: Concept, Inc., St. Petersburg, Fla.

[22] Filed: June 29, 1971

[21] Appl. No.: 157,852

[52] U.S. Cl. .................................. 128/11, 350/286
[51] Int. Cl. ........ A61b 1/06, A61b 1/26, G02b 5/04
[58] Field of Search ......................... 128/11, 13, 16; 350/96 R, 286

[56] References Cited
UNITED STATES PATENTS

| | | | |
|---|---|---|---|
| 2,247,258 | 6/1941 | Shepard .................................. | 128/16 |
| 2,354,471 | 7/1944 | Macintosh ......................... | 128/16 X |
| 2,553,540 | 5/1951 | Beckerman .................... | 350/96 R X |
| 3,153,267 | 10/1964 | Rowland, Jr. ....................... | 128/16 X |
| 3,433,940 | 2/1969 | Baez et al. .................. | 350/96 R UX |
| 3,598,113 | 8/1971 | Moore .................................. | 128/11 |
| 3,638,644 | 2/1972 | Reick .................................... | 128/16 |

*Primary Examiner*—Channing L. Pace
*Attorney*—Arthur H. Van Horn

[57] ABSTRACT

A laryngoscope which allows concurrent direct and indirect viewing of the larynx, especially when direct viewing is difficult or otherwise impossible. Such indirect viewing is permitted by the use of a prism or lens so arranged in the instrument that adequate working room is provided alongside the prism for direct viewing of the larynx and for insertion and removal of instruments, such as an endotracheal tube, and in which the prism also provides a "bite block". High intensity illumination is provided by a removable and replaceable source of battery power, conductors and a high intensity light source through the handle grip of the instrument.

7 Claims, 13 Drawing Figures

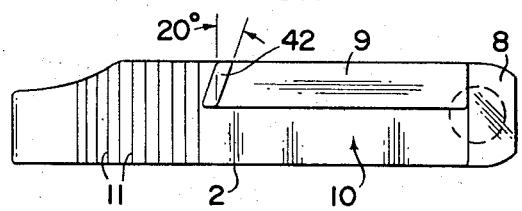
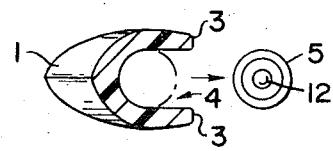
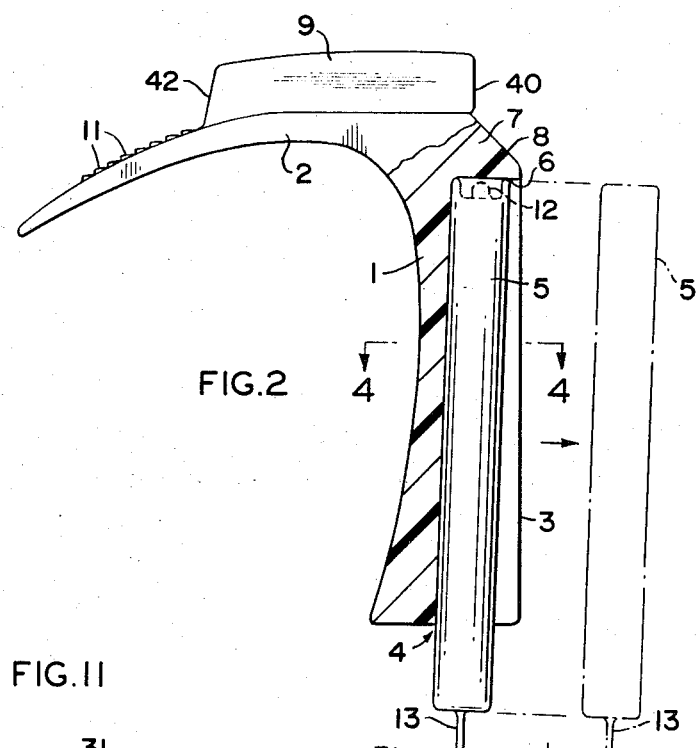
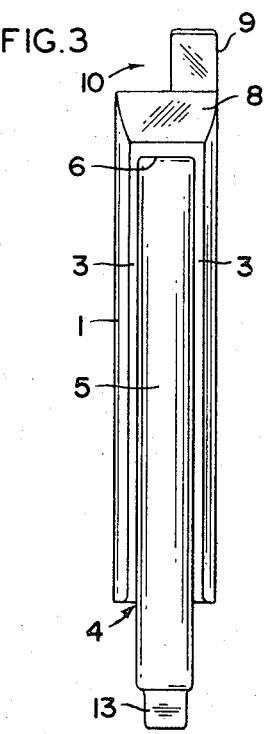
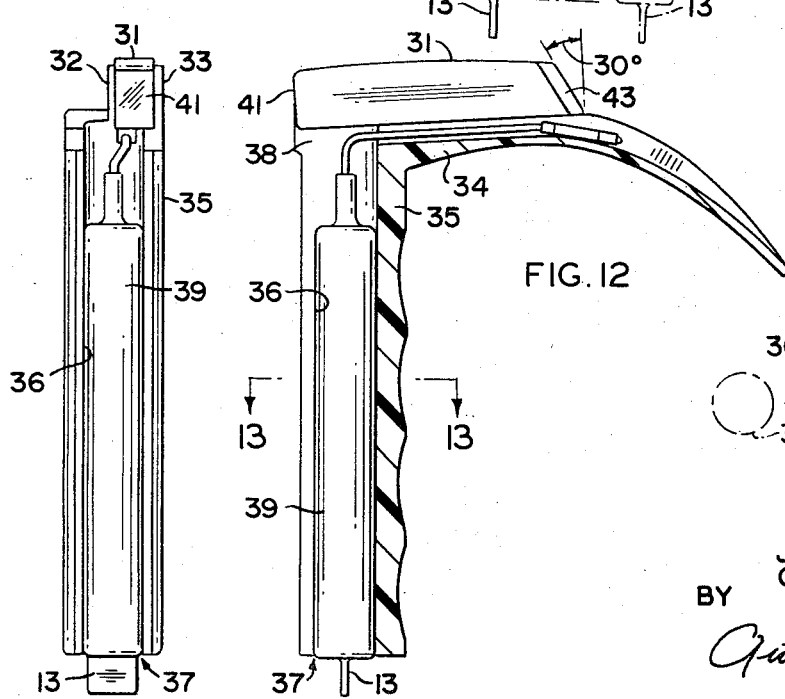
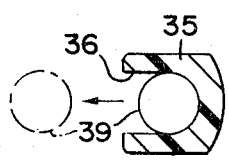
INVENTORS.
JOHN P. HUFFMAN
CARL L. FOLTZ
BY
ATTORNEY.

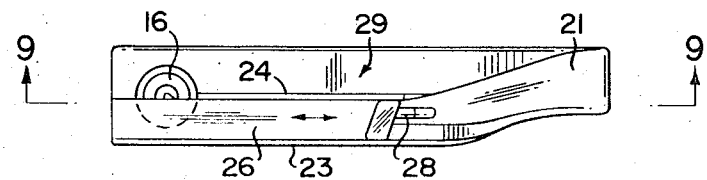
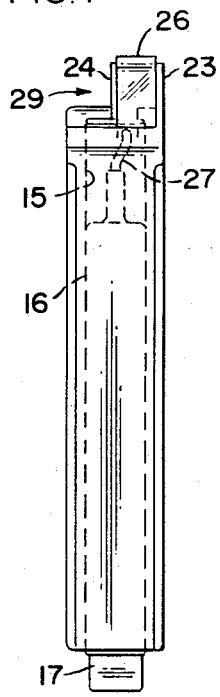
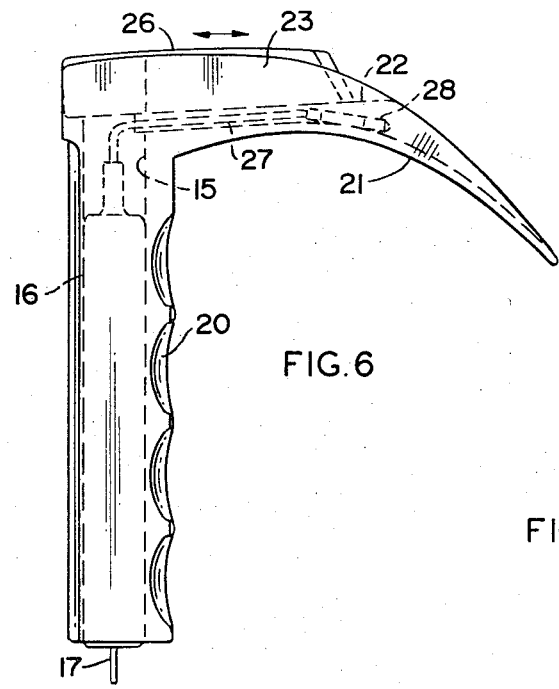
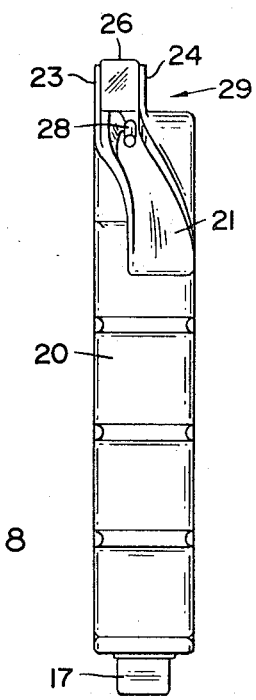
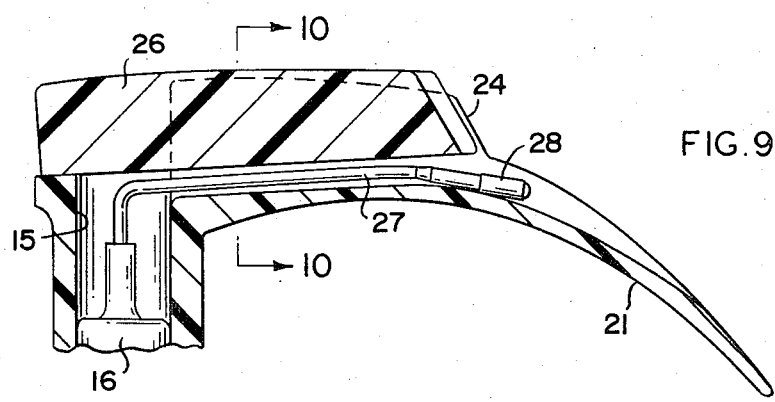
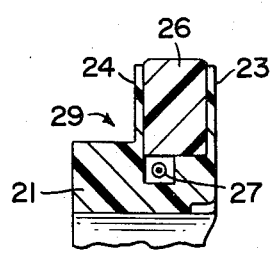
INVENTORS.
JOHN P. HUFFMAN
CARL L. FOLTZ

LARYNGOSCOPE

NATURE AND OBJECTS OF THE INVENTION

A laryngoscope of lightweight and simple construction suitable for inspecting the larynx, whether or not during anesthesia of the patient, by insertion of the blade of the instrument into the mouth and into the airway leading to the larynx. The instrument is provided with a removable high intensity light source energized by a source of battery power removably carried in the handle of the instrument, the light source also being removably housed in one form of the invention within a channel in the blade portion of the instrument or within the handle portion of another form of the invention. The light source is controlled by a simple rotatable "on-off," switch extending from the base of the handle. The instrument in either form allows concurrent direct and indirect visual inspection of the larynx and by its structural characteristics provides, in addition, excellent illumination of the area to be examined coupled with ample working room. Indirect viewing is through a prism carried in the blade alongside a channel for direct viewing. The light emanating from a light source in one form of the invention is directed through its channel to the area to be examined. While in another form of the invention, as will appear hereinafter, the light emanating on the light source is refracted through a second prism from which it is directed to the area to be examined.

THE DRAWING

FIG. 1 is a top plan view of a laryngoscope illustrating one embodiment of this invention.

FIG. 2 is a side elevation of the device in which part of the structure is shown in vertical section to more clearly illustrate the channel for receiving a source of battery power and a source of high intensity light.

FIG. 3 is a rear end view of the device shown in FIG. 2.

FIG. 4 is a transverse section taken on line 4—4 of FIG. 2.

FIG. 5 is a top plan view of a second embodiment of the invention.

FIG. 6 is a side elevation of the embodiment shown in FIG. 5.

FIG. 7 is a view looking in the direction toward the left face of FIG. 6.

FIG. 8 is a front view looking in the direction to the left toward the right side of FIG. 6.

FIG. 9 is an enlarged sectional view taken on line 9—9 of FIG. 5.

FIG. 10 is a cross sectional view taken on line 10—10 of FIG. 9.

FIG. 11 is a view of a third embodiment of the invention as viewed in the direction of the left hand side of FIG. 12.

FIG. 12 is a side view partly in section of the third embodiment of the invention; and FIG. 13 is a cross sectional view taken on line 13—13 of FIG. 12.

DESCRIPTION

The embodiments of the invention illustrated in the drawings include the preferred form shown in FIGS. 1 through 4; a second embodiment shown in FIGS. 5 through 10; and a third form shown in FIGS. 11 through 13, which is a modified form incorporating combined features of the embodiments illustrated in the first two forms of the invention.

First, referring to FIGS. 1 through 4, the instrument in its simplest form is formed with a handle or grip portion 1 for removably receiving and holding a battery and high intensity light source, and a blade portion 2 integrally formed with the handle portion as by molding or casting the grip and blade portion as a unitary structure from a light, tough thermoplastic material of the type represented by a polycarbonate such as acrylic nitride styrene. Such material is characterized by its ability to efficiently transmit and conduct light from a source directly to an objective, and which further is capable of receiving a high degree of polish on selected surfaces.

The handle portion 1 of the instrument is provided with a rearwardly opening channel defined by the spaced apart side walls 3 and is also preferably open at its bottom end at 4 to removably receive a source of battery power, "on-off" switch and high intensity light source package indicated at 5 which may be snapped or inserted into the channel for easy removal. The upper end of the channel is closed laterally by a flat wall 6 which constitutes one of the surfaces of the formed-in prism 7 at the juncture of the handle and blade rear portion. The refracting surface 8 of the prism 7 may extend laterally across the full width of the blade at its rear end traversing not only the area behind the rear end of prism 9 found on the blade portion but also the rear end of the direct viewing area 10 along the top of the blade.

If desired as an alternative, provision may be made along the blade portion and, as is indicated in FIGS. 5 through 12, in the form of an open ended channel defined by upright parallel walls and for the insertion and removal of an elongate prism which is frictionally gripped by these walls against accidental displacement.

The blade portion 2 of the instrument is curved longitudinally forwardly and downwardly of the handle or grip 1. The prism 9 formed on the blade portion extends forwardly along the top of the blade and along one lateral side thereof for indirect viewing providing an open direct viewing and working area 10 along the blade top surface. The downwardly curved and forwardly extending upper surface of the blade may be serrated or formed with a series of prism-like transverse ribs or refracting surfaces 11 as a means of preventing excessive loss of light transmission through the blade while permitting some radiation through the serrations in a direction forwardly of the external surface of the blade.

The battery and light source package 5 is preferably a self-contained unit which consists of an outer casing enclosing one or more battery cells, a high intensity light bulb 12 and an "on-off" switch 13, all electrically connected together as a snap-in unit to be inserted and removably held between the channel walls 3. It will be noted that the package casing terminates at its upper end in an annular flange surrounding the bulb 12 adjacent the prism bottom wall 6 and when the switch 13 is "on" and the light bulb 12 energized, light from the bulb is transmitted directly to and through the prism 7, refracted by the angular surface 8 and transmitted along the blade 2 toward its free forward terminal portion.

The unitary structural and the optical characteristics of the material from which the blade, handle and prism units are formed provide a lightweight, inexpensive, effective and simple laryngoscope construction whereby indirect as well as direct illuminated viewing of the larynx areas to be explored and treated is readily available, coupled with ample working space for insertion of instruments into these illuminated areas.

By this invention, light from the source 12 is efficiently distributed or "piped" through the prism 7 and refracted through and along the blade 2 to adequately illuminate the larynx and airway for viewing directly and/or indirectly during treatment and exploration.

Referring now to FIGS. 5 through 10 illustrating a second embodiment of the invention, the handle portion and blade portion are preferably formed as a unitary structure as by molding, or the like, of material such as that described in connection with FIGS. 1 – 4.

The handle portion of this embodiment comprises a cylindrical member 15 open at its bottom end for removably receiving a package 16 consisting of a source of battery power, an "on-off" switch 17, electrical conductor means 18 for supplying current from the battery source within the package to the lamp 19. The handle on its forward face is formed with an undulated grip portion as at 20.

The blade portion 21 is curved longitudinally forwardly and downwardly of the handle portion and also has a substantially horizontal base wall 22 extending forwardly from the handle and a pair of laterally spaced upright guide walls 23 and 24 forming between them and with the base, a channel opening upwardly and at both ends for removably receiving and supporting a prism 26, the conductor 27 and light source 28 therebetween.

It is to be noted, in this embodiment as well as in the embodiment shown in FIGS. 1 through 4, that the prism 26 is located at one side along the blade. This provides a space 29 along the blade for direct viewing of the larnyx as well as working room along the blade for the introduction of surgical or exploratory instruments, if desirable.

The third form of the invention which is illustrated in FIGS. 11, 12 and 13 embodies some of the structural features of both previously described and illustrated forms but differs from that shown in FIGS. 1 through 4 in that the prism 31 is removable from the channel defined by the walls 32 and 33. These walls are, as in FIGS. 5 through 10, preferably formed integral with the blade portion 34 of the instrument, as by molding, casting, or the like, from a lightweight, thermoplastic material of a type such as that described in connection with the form shown in FIGS. 1 through 4.

Another structural difference is to form the handle portion 35 with a longitudinal channel opening rearwardly as at 36, and also open at its bottom as at 37 and opening upwardly adjacent the bottom surface 38 of the prism 31 for easy "snap'in" insertion and removal of the battery and light package 39.

In each of the forms disclosed, the prism formed or supported on the blade portion has a flat polished rear end surface 40 facing the viewer and is provided with an angular flat polished surface 41 at its forward end to provide proper refraction of about 30° in one direction, as at 42, and lateral refraction of about 20° as at 43, thus permitting the illuminated viewing of the maximum area to be examined.

In the first form, as in FIGS. 1 through 4, it is to be noted that the integrally formed lens or prism 7 will effectively transmit light rays from the bulb 12 forwardly throughout the blade. The outer surface 8 may be treated to enable it to reflect light rays forwardly through the blade and to prevent loss of light at the rear of the blade.

We claim:

1. A laryngoscope comprising, as a unitary structure, a body having a forwardly extending blade portion and a downwardly extending grip portion, said structure formed of a thermoplastic polycarbonate material of the class represented by acrylic nitride styrene, and a prism formed along a portion of one side edge of the blade portion and integral therewith, said prism having a forward polished light refracting surface and a rear polished viewing surface.

2. A laryngoscope comprising, as a unitary structure, a body having a forwardly extending blade portion and a downwardly extending grip portion, said structure formed of a thermoplastic polycarbonate material of the class represented by acrylic nitride styrene, and a prism formed along a portion of one side edge of the blade portion and integral therewith, said prism having a forward polished light refracting surface and a rear polished viewing surface, said grip portion having a channel for removably receiving a source of relatively high intensity light.

3. The invention defined in claim 1 in which said prism is offset from the opposite side edge of the blade to provide a direct viewing and working access area forwardly along the surface of the blade.

4. The invention defined in claim 1 in which the upper surface of the blade is formed forwardly of the prism with a transverse series of light refracting surfaces.

5. A laryngoscope comprising, as a unitary structure a body having a forwardly and downwardly extending blade portion and a downwardly extending handle portion, said structure formed of thermoplastic polycarbonate material of the class represented by acrylic nitride styrene, said handle portion having a channel therein, a source of relatively high intensity light removably receivable in said channel, a light refracting element formed at the juncture of said handle and said blade portions to direct light from the light source in the handle to said refracting element and thence forwardly along the blade portion to the area being explored, said light refracting element comprising inclined surface extending between said handle portion and said blade portion such that said light refracting element forms an obtuse angle with said handle portion and said blade portion.

6. In a laryngoscope, a blade portion, a handle portion, said blade having a channel formed along its upper surface and along one side thereof, a prism supported in said channel for indirect viewing of the area to be explored, a wall of said channel providing a direct viewing and work space along the blade upper surface, said handle portion having a longitudinal channel therein, a light source package removably insertable in said longitudinal channel, said package including a source of electrical energy, a light source means directing a light beam forwardly along the blade and to the area to be explored by both direct and indirect viewing.

7. The invention defined in claim 6 in which said longitudinal channel is bifurcated lengthwise to removably receive and frictionally retain said package in the handle portion.

* * * * *